(12) United States Patent
Dovali-Solis

(10) Patent No.: US 6,782,703 B2
(45) Date of Patent: Aug. 31, 2004

(54) APPARATUS FOR STARTING A COMBINED CYCLE POWER PLANT

(75) Inventor: Francisco Dovali-Solis, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 104 days.

(21) Appl. No.: 10/241,345

(22) Filed: Sep. 11, 2002

(65) Prior Publication Data

US 2004/0045300 A1 Mar. 11, 2004

(51) Int. Cl.[7] ................................................. F02C 6/18
(52) U.S. Cl. ..................................... 60/785; 60/39.182
(58) Field of Search .......................... 60/39.182, 39.5, 60/785; 122/7.13

(56) References Cited

U.S. PATENT DOCUMENTS

| | | | |
|---|---|---|---|
| 3,358,450 A | 12/1967 | Schroedter | |
| 3,973,391 A | 8/1976 | Reed et al. | |
| 3,974,645 A | 8/1976 | Smith | |
| 4,028,884 A | 6/1977 | Martz et al. | |
| 4,282,708 A | 8/1981 | Kuribayashi et al. | |
| 4,437,313 A | 3/1984 | Taber et al. | |
| 4,519,207 A | 5/1985 | Okabe et al. | |
| 4,555,902 A * | 12/1985 | Pilarczyk ..................... | 60/39.5 |
| 4,561,254 A | 12/1985 | Martens et al. | |
| 4,598,551 A | 7/1986 | Dimitroff, Jr. et al. | |
| 4,843,823 A | 7/1989 | Freedman | |
| 5,029,443 A | 7/1991 | Hauser | |
| 5,042,246 A | 8/1991 | Moore et al. | |
| 5,095,706 A | 3/1992 | Saito et al. | |
| 5,412,936 A | 5/1995 | Lee et al. | |
| 5,473,898 A | 12/1995 | Briesch | |
| 5,525,053 A | 6/1996 | Shelor | |
| 5,558,047 A * | 9/1996 | Vetterick ................... | 122/367.1 |
| 5,632,143 A * | 5/1997 | Fisher et al. .............. | 60/39.182 |
| 5,737,912 A | 4/1998 | Krakowitzer | |
| 6,141,952 A | 11/2000 | Bachmann et al. | |
| 6,145,295 A | 11/2000 | Donovan et al. | |
| 2001/0022075 A1 * | 9/2001 | Mandai et al. ............ | 60/39.182 |

* cited by examiner

Primary Examiner—Louis J. Casaregola

(57) ABSTRACT

A combined cycle power plant (10) utilizing an air injection apparatus (60) for lowering the temperature and raising the mass of the exhaust gas provided to the heat recovery steam generator (22) from the gas turbine portion (12) of the plant. The air injection apparatus is utilized during startup of the plant to permit the gas turbine portion to be operated at a power level sufficiently high to ensure compliance with emissions regulations while at the same time not exceeding an upper exhaust temperature limit for warming the steam generator. The augmented exhaust stream (76) allows the steam generator to more quickly generate enough steam to roll the steam turbine (30), thereby shortening the overall startup sequence.

8 Claims, 4 Drawing Sheets

APPARATUS FOR STARTING A COMBINED CYCLE POWER PLANT

FIELD OF THE INVENTION

This application relates generally to the field of power generation, and more particularly to the field of combined cycle power plants.

BACKGROUND OF THE INVENTION

Combined cycle power plants are well known in the art. A combined cycle power plant includes both a gas turbine-based topping cycle and a steam turbine or a steam rankine bottoming cycle that is driven by heat in the exhaust of the gas turbine engine. U.S. Pat. No. 6,145,295, incorporated by reference herein, describes one such combined cycle power plant.

During startup of a combined cycle power plant from cold start conditions, the gas turbine portion of the plant necessarily must be started before the steam turbine portion. The term cold start is a relative term but is used herein to refer generally to conditions where the plant has not been operated for an extended time period, such as 48 hours, and where the boiler in not pressurized. During startup of an industrial gas turbine having a single shaft-constant speed arrangement, there is a relatively rapid increase in the flow rate of the exhaust from the gas turbine as it accelerates to operating speed. Thereafter, the exhaust gas flow rate remains relatively constant except for the effect of compressor inlet guide vane modulation. After the gas turbine reaches operating speed, the temperature of the exhaust gas gradually increases as the firing temperature of the gas turbine is increased up to the level required to produce the desired power output. Modern gas turbine engines may have firing temperatures in excess of 1,400° C. at full rated power. However, the rate of increase in load and temperature of the gas turbine exhaust is constrained by thermal transient stress limits in the components of the steam turbine and the balance of plant, including the heat recovery steam generator (HRSG) that is exposed to the hot exhaust gas stream. Note that the terms heat recovery boiler, heat recovery steam generator, HRSG, and boiler are used herein to include both drum and drumless boilers (once through steam generators).

Although the gas turbine exhaust flows through the HRSG during the startup of the gas turbine, a considerable period of time elapses before an initially cold HRSG is capable of generating steam that is sufficient to roll the steam turbine and having adequate pressure and superheat for expansion in the turbine without unacceptable moisture generation. The startup temperature of the gas turbine exhaust is regulated to gradually heat and pressurize the HRSG. In a typical combined cycle plant, the gas turbine may be initially limited to about 20–30% rated power in order to maintain the exhaust at a sufficiently low temperature to maintain stresses within acceptable levels in the cold HRSG. During this heating period, the steam turbine and associated auxiliary systems are also heated gradually by bleeding a small quantity of the steam produced by the HRSG through the steam turbine and into the condenser. However, the quantity of steam produced by the HRSG at such a low gas turbine power level is insufficient to initiate steam turbine roll and to accelerate the steam turbine to operating speed. Thus, the startup of the steam turbine is delayed until both the HRSG and the steam turbine are brought up to temperature with the gas turbine operating at limited power levels. As the system temperature increases, the gas turbine power level is gradually increased until eventually the quantity and quality of steam produced by the HRSG is sufficient to support the initial roll of the steam turbine.

The necessity to gradually heat a combined cycle power plant during startup reduces the overall efficiency of the plant and reduces the plant's ability to respond to rapidly changing power requirements. Furthermore, the operation of the gas turbine portion of the plant at less than full rated load may result in a level of gaseous emissions that exceeds regulatory or Original Equipment Manufacturers base load contractual requirements. In particular, it is known that the level of carbon monoxide produced in a gas turbine engine will increase as the firing temperature is decreased during part-load operation. Operation of the gas turbine portion of a combined cycle power plant at 20–50% rated load during the startup phase will often place the plant outside of emissions compliance limits. Not only does such operation have an undesirable impact on the local environment, but it may also have a negative financial impact on the owner or operator of the plant, since a plant revenue stream may be adversely impacted by operation outside of regulatory compliance limits. Certain power pool arrangements may provide that the owner/operator of the plant does not receive any payment for the power produced during periods of noncompliance with emissions regulations. Accordingly, there is a strong incentive to reduce the startup time for a combined cycle power plant and/or to reduce the operation of the plant at non-compliance emissions points.

U.S. Pat. No. 5,412,936, incorporated by reference herein, describes a method of effecting startup of a cold steam turbine system in a combined cycle power plant. This method requires steam to be extracted from an intermediate location in the superheater portion of the HRSG. In one embodiment, this system utilizes a gas turbine exhaust bypass damper to direct a portion of the gas turbine exhaust away from the HRSG in order to allow the gas turbine to be operated at any load during the startup of the steam turbine.

U.S. Pat. No. 5,473,898, also incorporated by reference herein, describes a method and apparatus for warming a steam turbine in a combined cycle power plant. Compressed air from the compressor section of the gas turbine is used to warm the steam turbine from cold conditions. This allows the turbine warming process to begin at an earlier time than would otherwise be possible when using only steam produced by the HRSG as the heat source.

SUMMARY OF THE INVENTION

Further improvements are desired to reduce the time necessary for starting a combined cycle power plant, to increase the amount of power produced and to ensure compliance with emissions requirements during the startup process.

Accordingly, a combined cycle power generating apparatus is described herein as including: a gas turbine portion producing an exhaust gas; a heat recovery apparatus receiving the exhaust gas and producing steam; a steam turbine receiving the steam; and an air injection apparatus combining a flow of injection air with the exhaust gas upstream of the heat recovery apparatus. The air injection apparatus may be an air ejector having a motive air inlet in fluid communication with a compressor of the gas turbine portion for receiving compressed air, and having an ambient suction air inlet for receiving ambient air for combining with the compressed air to produce the injection air. Alternatively, the air injection apparatus may be a fan.

A method of starting a combined cycle power plant is described herein. The plant includes (i) a gas turbine portion comprising a compressor for producing compressed air and a turbine for producing exhaust gas, (ii) a heat recovery steam generator for producing steam by transferring heat from the exhaust gas to a flow of feed water, and (iii) a steam turbine for expanding the steam, and the method includes: starting the gas turbine portion to produce a flow of exhaust gas; producing a flow of injection air; and combining the flow of injection air with the flow of exhaust gas to produce an augmented exhaust stream directed through the heat recovery steam generator to produce a flow of steam for starting the steam turbine. The method may further include: producing a flow of compressed air in the compressor; and using a portion of the flow of compressed air produced in the compressor to produce the flow of injection air.

BRIEF DESCRIPTION OF THE DRAWINGS

These and other advantages of the invention will be more apparent from the following description in view of the drawings that show.

DETAILED DESCRIPTION OF THE INVENTION

Figure 1:
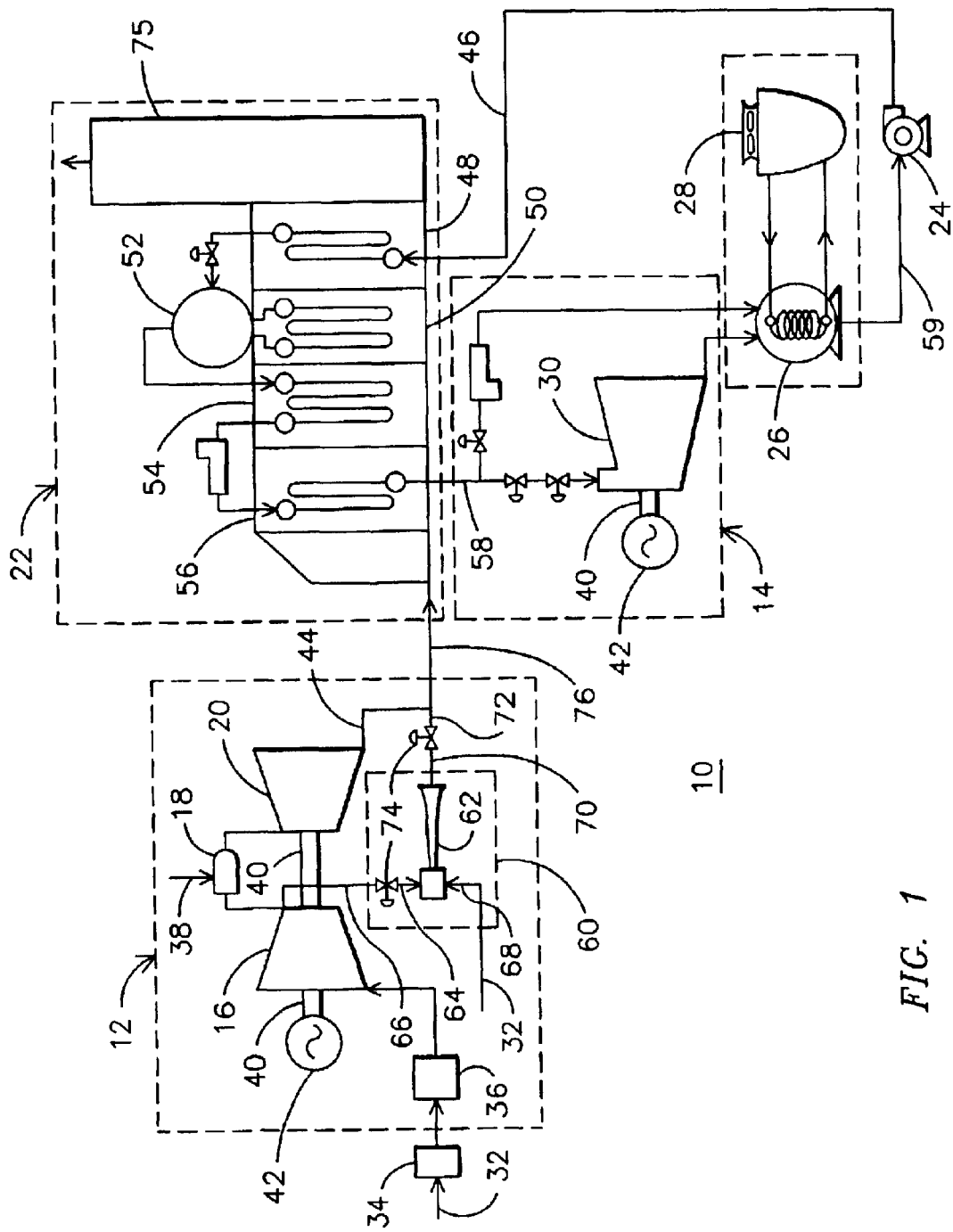
FIG. 1 is a schematic diagram of a combined cycle power plant having a bypass circuit connecting the compressor outlet and the gas turbine exhaust and including an air ejector.

FIG. 1 is a schematic diagram of an improved combined cycle power plant 10 including a gas turbine topping cycle portion 12 and a steam turbine bottoming cycle portion 14. Major components of the topping cycle portion 12 include a compressor 16, a combustor 18 and a turbine 20. Major components of the bottoming cycle portion 14 include a heat recovery boiler such as heat recovery steam generator (HRSG) 22, a boiler feed pump 24, a condenser 26, a cooling tower 28 and a steam turbine 30.

The gas turbine topping cycle portion 12 receives ambient air 32 through a filtration system 34 and a set of inlet guide vanes 36. The ambient air 32 is compressed by compressor 16 and delivered to combustor 18 where it is used to combust a flow of fuel 38 to produce hot combustion gas. The hot combustion gas is delivered to turbine 20 where it is expanded to develop shaft power. Typically the turbine 20 and compressor 16 are connected to a common shaft 40, which in turn is connected to an electrical generator 42.

The exhaust gas 44 produced by the topping cycle portion 12 is directed to the HRSG 22 where it is used to heat and to evaporate a flow of feed water 46 delivered to the HRSG 22 by boiler feed pump 24. The HRSG 22 may typically include a plurality of sections including an economizer 46, an evaporator 50 having a steam drum 52, and one or more superheaters 54, 56. The HRSG 22 can also include different pressure levels as well as an intermediate pressure reheat steam loop (not shown). The feed water 46 passes through each of the HRSG sections in series in the order listed above, whereupon it is heated by the gas turbine exhaust 44 and exits as superheated steam 58 for delivery to the steam turbine 30. The steam is expanded within the steam turbine 30 extracting power via a shaft. The shaft may be the same shaft 40 connected to generator 42 and turbine 20. In other embodiments, the gas turbine 20 and steam turbine 30 may drive separate shafts to power separate loads. Separate electrical generators 42 may be connected to the gas turbine 20 and the steam turbine 30, or each of the turbines may be connected to the same electrical generator 42. The expanded steam leaving the steam turbine 30 is condensed in condenser 26, whereupon the condensate 59 is further cycled through the bottoming cycle portion 14 by boiler feed pump 24.

The aforementioned components of the combined cycle power plant 10 are fairly typical of those found in the prior art, and other known variations of these components and related components may be used in other embodiments of the present invention. The combined cycle power plant 10 of FIG. 1 further includes a dilution air injection apparatus 60 for injecting air into the gas turbine exhaust gas 44 upstream of the HRSG 22 during startup of the plant 10. The air injection apparatus 60 includes an air ejector system 62 having a motive air inlet 64 for receiving a portion of the compressed air 66 produced by the compressor 16, and an ambient suction air inlet 68 for receiving a supply of ambient air 32 such as through filtration system 34 to be combined with the compressed air 66 to produce a flow of injection air 70. Injection apparatus 60 further includes appropriate fluid connections such as conduits 72 and flow control devices such as valves 74 for controlling the respective airflows to deliver a controlled amount of injection air 70 into exhaust gas 44 upstream of the HRSG 22 to produce an augmented exhaust stream 76. Augmented exhaust stream 76 has a higher mass and a lower temperature than does the flow of exhaust gas 44 leaving the turbine 20. Air ejector 62 may be a commercially available device similar to a Model 426 sold by Schutte and Koertig (www.s-k.com). The supply of compressed air 66 is preferably taken from the outlet of compressor 16 in order to use the highest pressure available in the system as motive fluid for the ejector, although lower pressure compressed air may be taken from other stages of the gas turbine compressor 16 or supplemented with steam from the combined cycle in other embodiments. The compressed air 66 may be injected into the exhaust gas 44 without the use of air ejector 62, and other sources of compressed air may be used including a motor-driven fan for example, or a separate source of motive fluid for the ejector such as steam from the boiler may be used. However, the embodiment illustrated in FIG. 1 using an air ejector to supplement the mass of compressed air 66 from compressor 16 with ambient air 32 provides a more efficient system.

Figure 2:
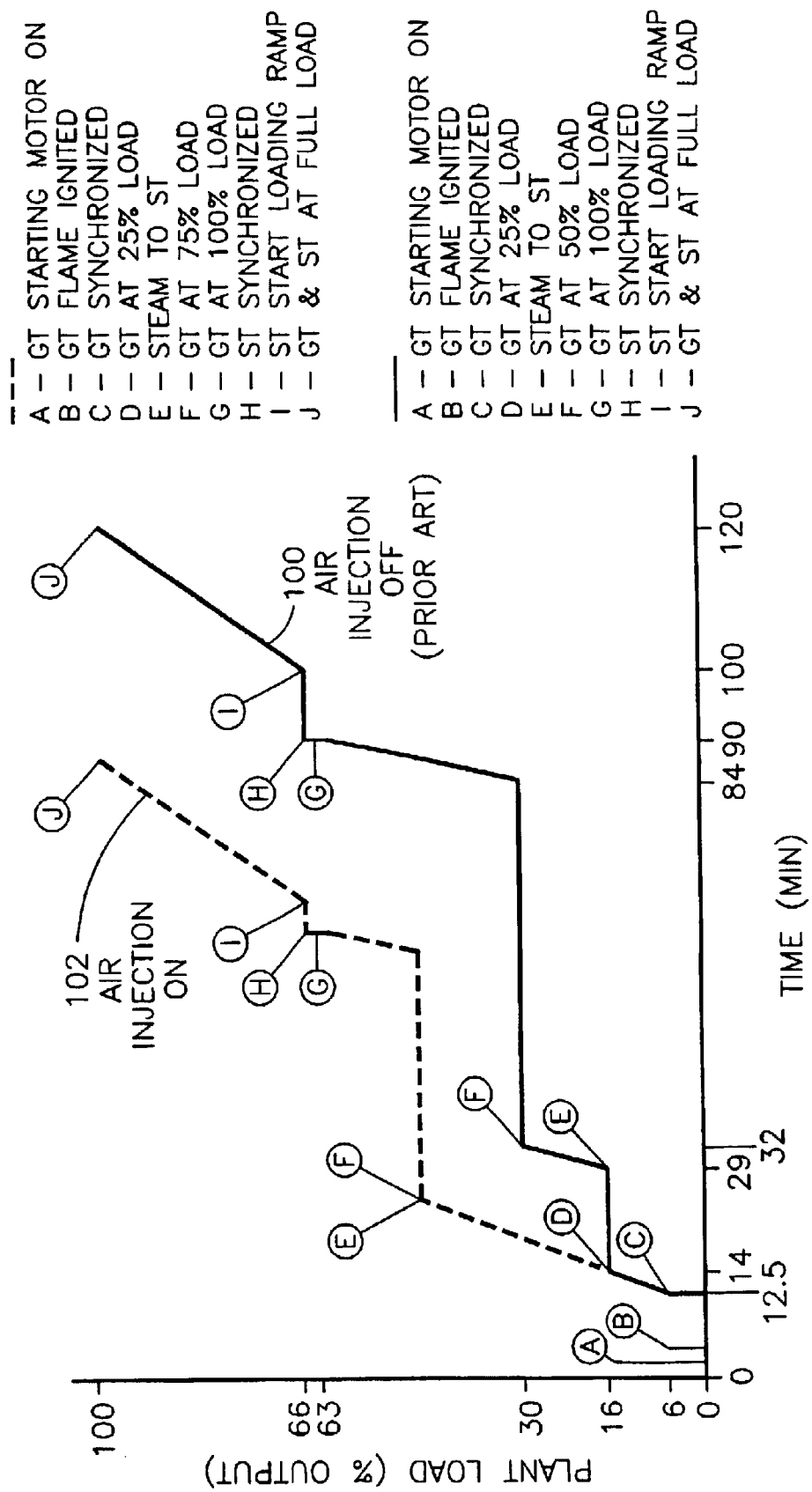
FIG. 2 is a graph illustrating the gross plant load versus time during the startup of a combined cycle power plant both with and without the use of a bypass circuit.

The startup of a combined cycle power plant 10 both with and without the use of an air injection system 60 is illustrated in FIG. 2. Curve 100 shows the power output versus time using prior art procedures and equipment, while curve 102 shows power output versus time with the air injection system 60 activated and using the procedure described herein. The plant 10 is started from shutdown conditions by first starting gas turbine 12. The power level of gas turbine 12 is increased to a level above that which would otherwise be possible without the use of air injection apparatus 60, and preferably is increased as rapidly as possible to a power level where all emissions in the gas turbine exhaust are at their lowest levels or at a desired low level (on a ppm basis) for satisfying emissions regulations and plant permit requirements for the installation as a whole. During this time, the flue gas temperature into the boiler 22 is kept within acceptable levels by means of the air injection system 60. For example, the gas turbine 12 may be powered to a level of about 70% or 75% of rated power as quickly as permitted by gas turbine constraints alone. During this period, the valves 74 of air injection apparatus 60 are positioned to provide an appropriate flow of injection air 70 so that the temperature of the augmented exhaust stream 76 does not exceed that which is acceptable for the warming of HRSG 22 and that which is used for startup under prior art procedures. Inlet guide vanes 36 are positioned to provide a flow of ambient air to the compressor 16 that is sufficiently high to provide both the combustor 18 and the air ejector 62. Although the temperature of augmented exhaust stream 76 is maintained at a temperature no higher than the temperature of a prior art exhaust stream during this startup phase, the total amount of heat energy being supplied to the HRSG 22 during startup is greater than the amount of energy that is supplied at this stage of a prior art process due to the difference in the product of mass times enthalpy of the respective flows. The HRSG 22 will be unable to transfer all of this extra heat into the feed water 46 as a whole (both water and steam), and thus more heat will escape to atmosphere through the HRSG exhaust stack 75 than with the prior art system at an equivalent heat input. The overall effect of the augmented stream 76 is a lower heat transfer in the high temperature (fore) section of the HRSG 22 and an increase in heat transfer to the lower temperature (aft) sections of the HRSG 22. The increased energy stream in the exhaust as well as the transfer in the colder sections of the HRSG allows the HRSG 22 to produce more steam during the warming phase, and importantly, it allows the HRSG 22 to provide a sufficient quantity and quality of steam necessary for rollup of the steam turbine 30 significantly earlier than if no injection air 70 were provided. This timesaving can be seen in FIG. 2 by comparing the time at which the turbine roll is initiated for the two different modes of startup, i.e. point "H" on the respective curves. This figure assumes that the condenser 26 is available when needed, which may necessitate the use of a separate apparatus (not shown) for maintaining the vacuum in condenser 26. The availability of the steam turbine portion 14 of the plant 10 is thus improved over the prior art, and the overall output of the plant is improved. In the example of FIG. 2, the total plant startup time to full power is reduced from about 120 minutes to about 85 minutes and the total power generated by the plant during the startup phase is increased by about one third (area under the respective curves) when the air injection apparatus 60 is used. Importantly, the gas turbine portion 12 can be operated at a power level sufficiently high so that the gas turbine exhaust emissions are at a desired low level at or close to their lowest concentration levels measured on a ppm basis. These lower emissions levels allow the operator to satisfy regulatory and contractual emissions commitments, thereby potentially further increasing the revenue generated by the plant and providing a reduced environmental impact.

Figure 3:
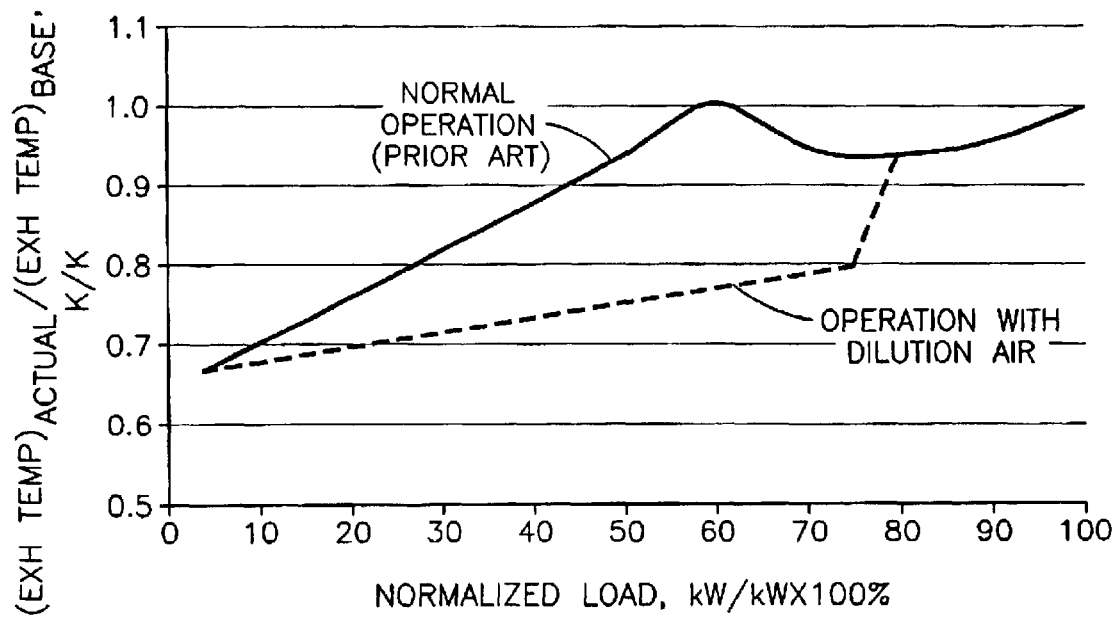
FIG. 3 illustrates the gas turbine exhaust temperature of the power plant of FIG. 1 with the air injection apparatus both ON and OFF.
Figure 4:
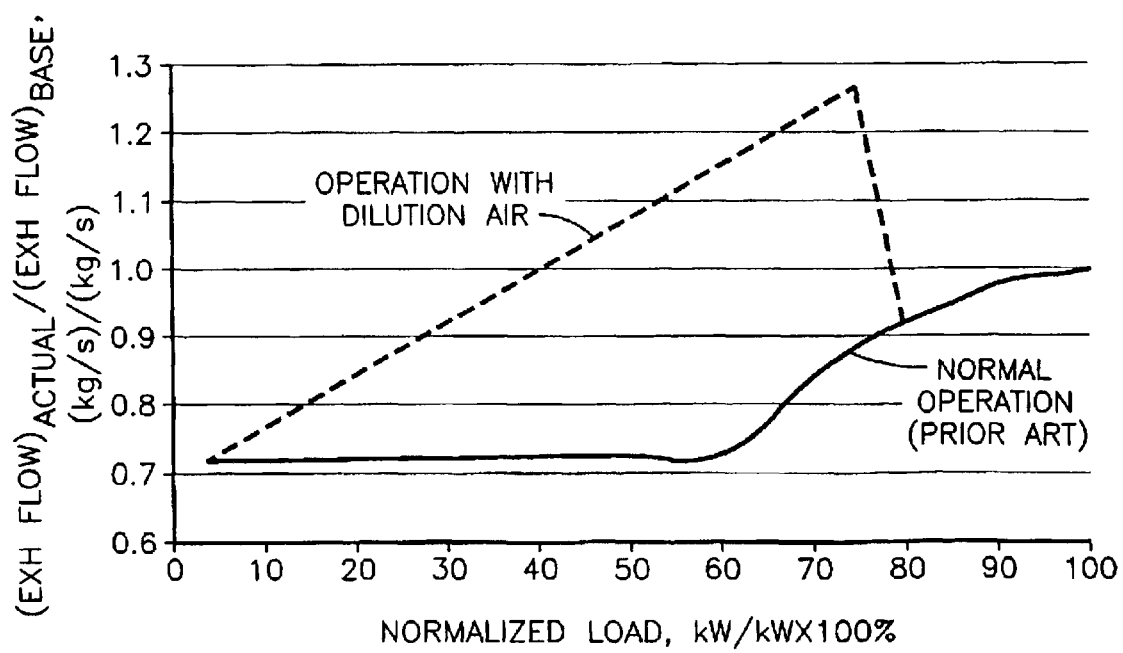
FIG. 4 illustrates the gas turbine exhaust mass flow rate of the power plant of FIG. 1 with the air injection apparatus both ON and OFF.
Figure 5:
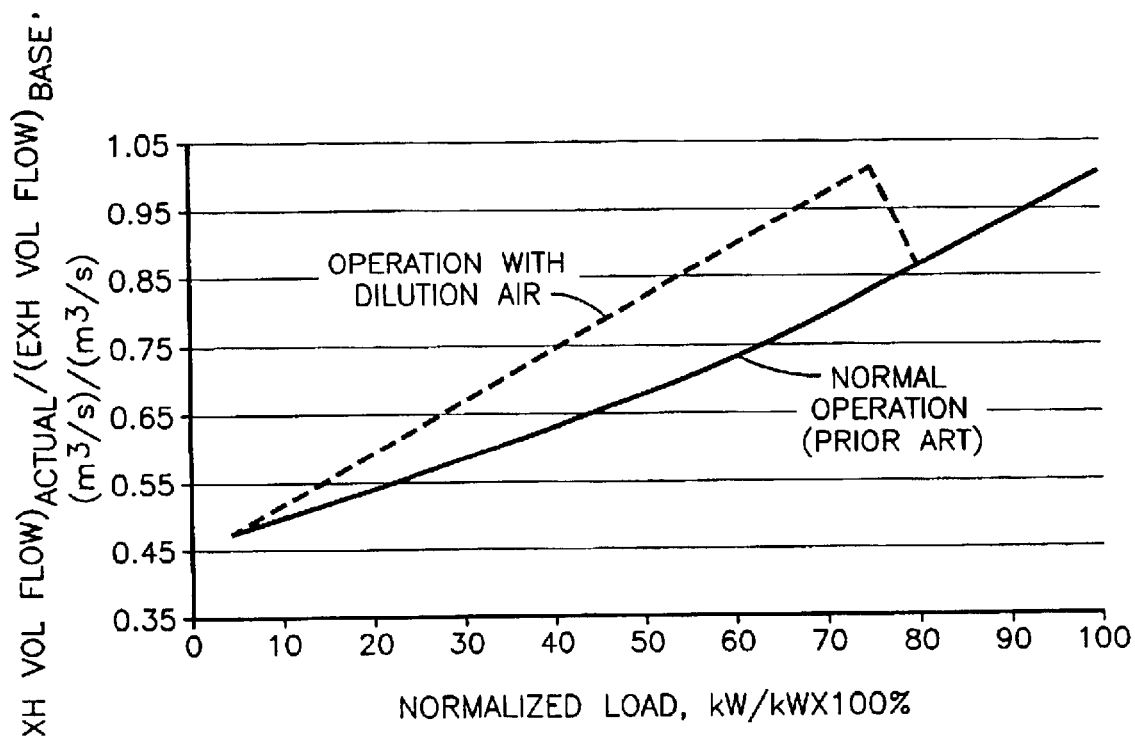
FIG. 5 illustrates the gas turbine exhaust volumetric flow rate of the power plant of FIG. 1 with the air injection apparatus both ON and OFF.
Figure 6:
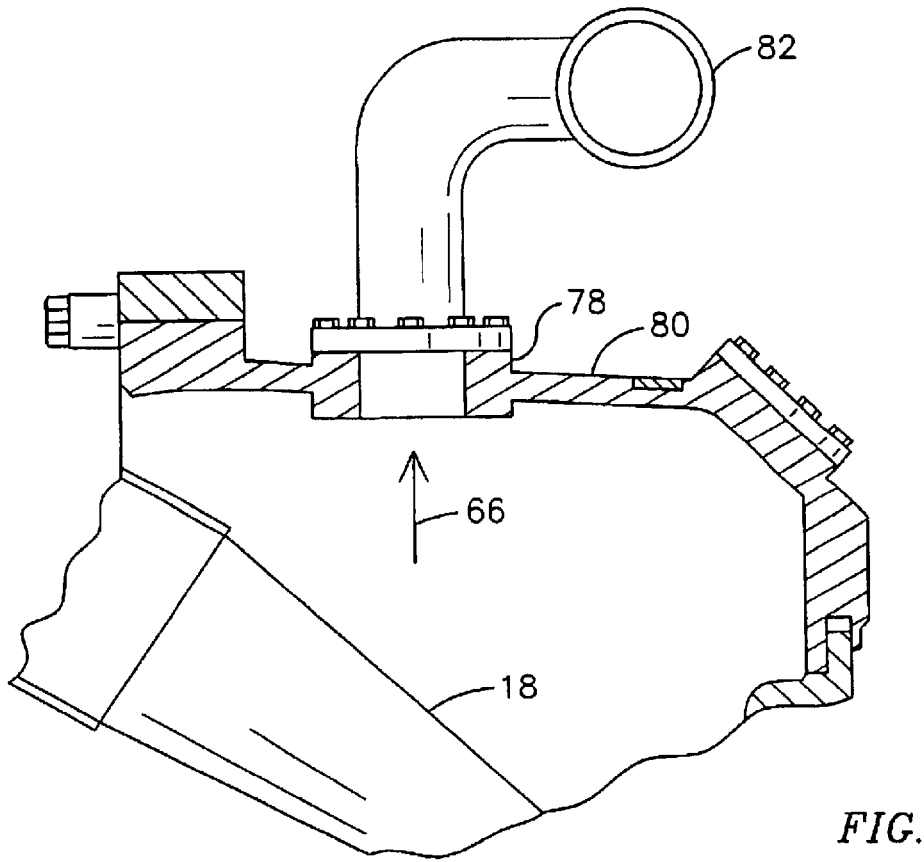
FIG. 6 is a partial cross-sectional view of a piping configuration that may used for the air injection apparatus conduit of the power plant of FIG. 1.

FIGS. 3–5 illustrate typical estimated characteristics of the gas turbine exhaust stream for one application both during normal (prior art) operation with the air injection apparatus 60 not operating (solid lines) and with the air injection apparatus 60 operating (dashed lines). FIG. 3 illustrates temperature as a percentage of base load temperature; FIG. 4 illustrates mass flow as a percentage of mass flow at base load; and FIG. 5 illustrates volumetric flow as a percentage of base load volumetric flow. FIG. 3 shows how a combined cycle power plant 10 incorporating the present invention can be operated with its gas turbine at an elevated power level (e.g. 75% load) but with an exhaust temperature that is about the same as if the gas turbine were operated at a lower load (e.g. 25% load). Normal gas turbine operation at 75% rated load ($_{@75\%}$) will produce a certain amount of heat, while operation at the same power level with the air injection apparatus 60 on ($_{INJ@75\%}$) will produce a higher heat output $[Q_{INJ@75\%}=m_{INJ@75\%} \times h(\sim T_{EXH-25\%})]$ Although $m_{@75\%} < m_{INJ@75\%}$, the product of $[m_{INJ@75\%} \times h(\sim T_{EXH-25\%})]$ is larger than $[m_{75\%} \times h(T_{EXH\ 75\%})]$ even if $(\sim T_{EXH-25\%}) < (\sim T_{EXH-75\%})$ by $\sim 250°$ F. for a typical application. For the HRSG, the temperature difference between the gas turbine exhaust and the working fluid in the fore sections of the boiler (i.e., superheater pinch) is lower than design with the air injection apparatus 60 on, therefore the unit will generate colder and less steam than the normal 75% load case (air injection off), but considerably more steam than the normal 25% load operation. The aft sections of the boiler see more heat with air injection than during normal operation, and the pinch point in these sections will approach zero. A sufficiently large quantity of heat is being put into the heat exchanger so that the steam generation in the lower sections of the boiler is at a maximum; however there is so much exhaust gas that the working fluid exits each HRSG section at almost the same temperature as the exhaust gas entering that section. When this occurs, there in no more heat exchange between exhaust gas and working fluid. The remaining energy in the gas is vented through the stack, since it cannot transfer into the working fluid. With the air injection apparatus 60 operating the steam turbine can be supplied with steam that meets its heating requirements with a large enough quantity of steam to permit roll-up of the steam turbine.

In order to improve the operation of an electrical generating plant, one normally looks to changes that will improve the overall efficiency of converting the fuel supply into electricity. The present invention takes a different approach by providing a system that may actually have reduced efficiency when compared to a prior art plant operating at the same gas turbine load in full steam bypass mode. This reduced efficiency is a result of the additional heat energy that is vented to atmosphere through the exhaust stack 75 during the startup phase. However, the present invention compensates for that effect by increasing the generating capacity of the plant by providing a faster startup sequence and by the generation of a higher level of power during the startup phase. Furthermore, the present invention ensures that emission requirements can be satisfied during startup, thereby improving the economic efficiency of the plant. These benefits are provided with components and procedures that can be designed into a new plant or incorporated into an existing plant. For example, existing combined cycle power plants utilizing a Siemens Westinghouse Power Corporation model W501F gas turbine may include a plurality of shell penetrations from a now-superseded combustion system. That superseded system had been used to bypass a portion of the compressed air generated by the compressor around the combustor to the turbine during low power operation in order to raise the combustion firing temperature and to decrease the generation of carbon monoxide. That system has been removed from all W501F plants, however the shell penetrations 78 remain and can be utilized as part of the air injection apparatus 60 of the present invention, as shown in FIG. 3. Thirty-two such penetrations 78 are disposed around the circumference of a model W501F gas turbine casing 80. Compressed air 66 may be drawn out of the shell 80 and into a ring manifold 82 upstream of the plurality of combustors 18. The ring manifold 82 is connected to the ejector motive air inlet 64 described above. Connection of the ejector outlet conduit 72 to the gas turbine exhaust pipe can be made in existing plants by construction methods known in the art.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. A combined cycle power generating apparatus comprising:
    a gas turbine portion producing an exhaust gas;
    a heat recovery apparatus receiving the exhaust gas and producing steam;
    a steam turbine receiving the steam;
    an air injection apparatus combining a flow of injection air with the exhaust gas upstream of the heat recovery apparatus;
    wherein the air injection apparatus comprises an air ejector, and
    wherein the air ejector comprises a motive air inlet in fluid communication with a compressor of the gas turbine portion for receiving compressed air, and wherein the air ejector further comprises an ambient suction air inlet for receiving ambient air for combining with the compressed air to produce the injection air.

2. The apparatus of claim 1, further comprising a ring manifold connected to a plurality of shell connections of the gas turbine portion for receiving the compressed air from the compressor, the ring manifold in fluid communication with the air ejector motive air inlet.

3. The apparatus of claim 1, wherein the air injection apparatus comprises one of the group of an air ejector and a fan.

4. The apparatus of claim 1, further comprising a flow control device for controlling a rate of flow of injection air into the exhaust gas for controlling a temperature of the exhaust gas received by the steam turbine.

5. In a combined cycle power plant having a gas turbine topping cycle portion delivering a flow of exhaust gas to a steam turbine bottoming cycle portion, the improvement comprising an air injection apparatus for combining injection air with the flow of exhaust gas to produce an augmented exhaust stream for delivery to the steam turbine bottoming cycle portion;
    the improvement further comprising an air ejector having a motive air inlet receiving compressed air from a compressor of the gas turbine topping portion and having an ambient air suction inlet receiving ambient air and having an outlet delivering the injection air.

6. In the combined cycle power plant of claim 5, the air injection apparatus further comprising one of the group of an air ejector and a fan.

7. In the combined cycle power plant of claim 5, the improvement further comprising a valve controlling a flow rate of the injection air for selectively combining injection air with the flow of exhaust gas only during startup of the combined cycle power plant.

8. In a combined cycle power plant having a compressor for producing compressed air for delivery to a gas turbine, the gas turbine having a casing with a plurality of existing casing penetrations, the gas turbine operable to provide exhaust gas to a heat recovery boiler for producing steam for a steam turbine, a modification comprising:
    an air ejector having an ambient air inlet, a motive air inlet, and an outlet;
    a manifold connected to the plurality of casing penetrations for conveying a portion of the compressed air produced by the compressor to the motive air inlet of the air ejector; and
    a conduit connected to the outlet of the air ejector for combining injection air produced by the air ejector with the exhaust gas to form an augmented exhaust stream for delivery to the heat recovery boiler.

* * * * *